March 22, 1966     H. ALLEN     3,241,808
VALVE HAVING A PRELOADED VALVE SEAT SEAL
Original Filed Dec. 21, 1961     2 Sheets-Sheet 1
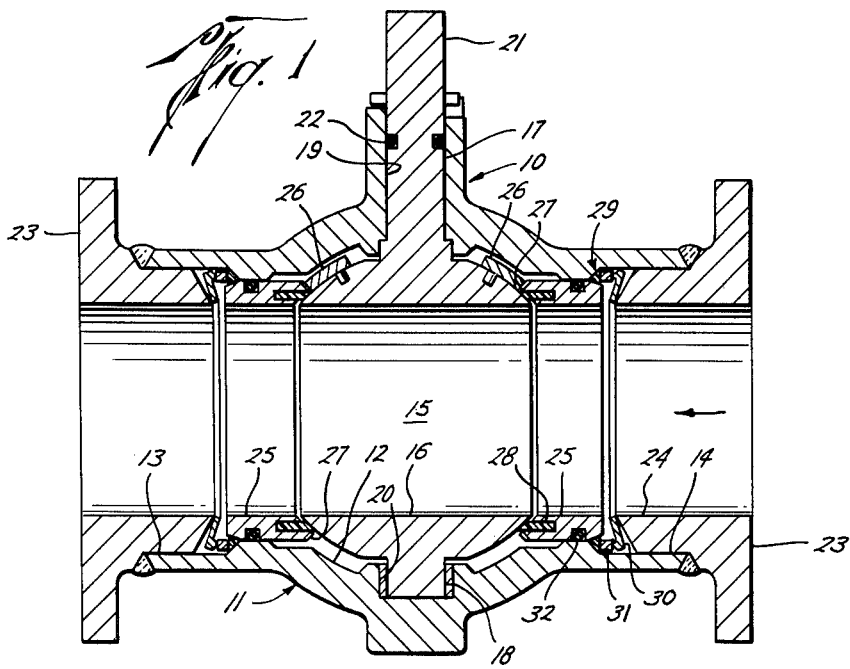
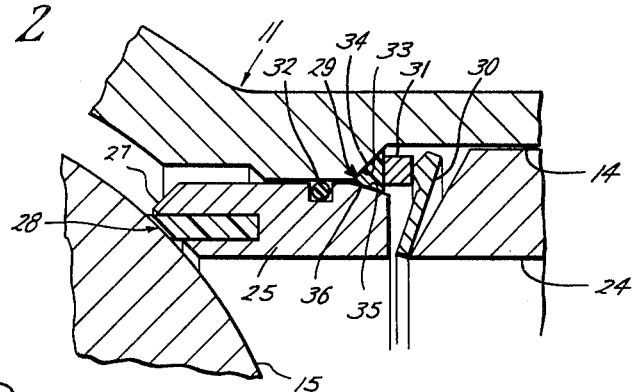
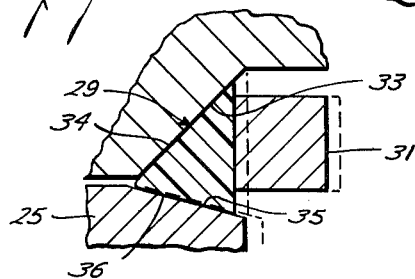
Herbert Allen
INVENTOR.
BY
ATTORNEYS March 22, 1966        H. ALLEN        3,241,808
VALVE HAVING A PRELOADED VALVE SEAT SEAL
Original Filed Dec. 21, 1961        2 Sheets-Sheet 2
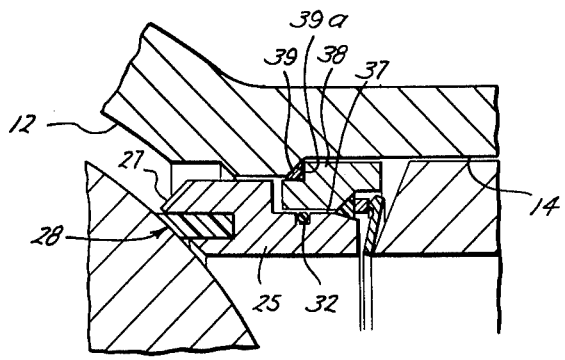
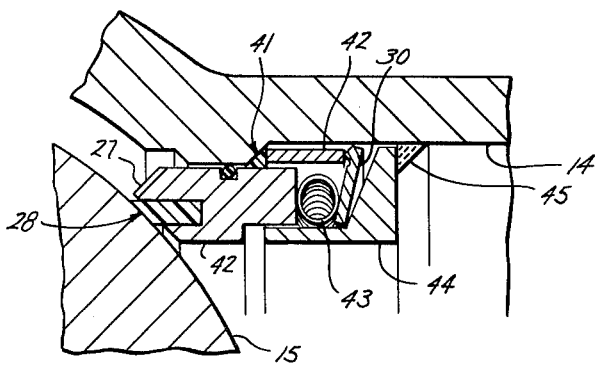
Herbert Allen
INVENTOR.

United States Patent Office 3,241,808
Patented Mar. 22, 1966

3,241,808
VALVE HAVING A PRELOADED VALVE
SEAT SEAL
Herbert Allen, Houston, Tex., assignor to Cameron Iron
Works, Inc., Houston, Tex., a corporation of Texas
Continuation of application Ser. No. 161,205, Dec. 21,
1961. This application May 25, 1965, Ser. No. 458,659
13 Claims. (Cl. 251—174)

This application is a continuation of my co-pending application Serial No. 161,205 filed December 21, 1961 and entitled "Valve," now abandoned.

This invention relates to improvements in a valve of the type having an annular seat sealably slidable within a conduit in the valve body on one side of the valve member so as to be urged against the valve member by line pressure. Normally, the seat is preloaded so that its inner end engages the valve member to form an initial seal which is supplemented by the line pressure.

Frequently, there is an outwardly protruding wear ring of a deformable material on the inner ends of the body of the seat which serves to seal between the seat and the valve member. Polytetrafluoroethylene, which is supplied by the E. I. du Pont de Nemours & Co., Inc., under the trademark "Teflon," has been found to be especially suitable for this purpose. This plastic not only is inert insofar as most fluids are concerned, but also has a low coefficient of friction with metal so that, in the case of a wear ring formed of it, the metal valve member is easily moved over the inner end of the seat, and, when the seat is rotatable, as shown in my Patent No. 2,977,975, the wear ring is easily moved over the valve member without the necessity of lubrication.

For these same reasons, this plastic material is also especially well suited for use as a seal ring between the metal seat and valve body conduit in which it is reciprocable. However, a plastic material such as "Teflon" has other characteristics which complicate its use in this environment. For one thing, it has a very high coefficient of thermal expansion compared with metals, and thus, in response to temperature changes, a seal made thereof may separate from the surface against which it is to seal. Accordingly, it has been proposed to preload a "Teflon" seal ring, as by means of a spring acting between it and a shoulder in the conduit in the valve body. It has further been proposed that the seal ring bear against a shoulder on the outer end of the seat so that the preload of the spring is transmitted to the wear ring on the inner end of the seat as well as to the seat-to-body seal.

I have found that in order to provide an effective seal with the conduit and seat, particularly at low pressures and low temperatures, a seal ring of "Teflon" is preferably preloaded to above its yield point. On the other hand, if the preload transmitted to the wear ring is too great, the resulting friction between the seat and valve member will raise the torque requirements for operating the valve member beyond practical limits. Further, as the wear ring is being traversed by the opening in the valve member during opening or closing of the valve, the unsupported portion of the wear ring will be excessively urged into the opening and damaged thereby. If an attempt were made to reconcile these problems by reducing the preload so transmitted to the wear ring through the use of a seal ring having a thin cross section, such a ring would probably fail. This is especially true in view of the wear and tear on the ring resulting from its reciprocation and rotation within the conduit.

Heretofore, it has also been conventional to machine the surface of the body conduit over which the seal ring slides in order to form a tighter seal and reduce the friction therebetween. Obviously, this machining operation adds to the over-all cost of the valve.

It is therefore an object of this invention to provide a valve of this type in which both the inner end of the seat and the ring sealing between the seat and body conduit are preloaded in a manner to stress the ring to the desired value without the operating difficulties above mentioned.

A further object is to provide a valve of the type described in which the desired preloads are applied to both the inner end of the seat and the sealing ring thereabout by means of a single preloading element.

Another object is to provide a valve in which the conduit engaged by the seal ring need not be machine finished.

Still another object is to provide such a valve in which the seal ring is made from a material, such as "Teflon," which greatly facilitates rotation as well as reciprocation of the seat with respect to the body.

A still further object is to provide a seat and seal ring of a construction especially well suited for carrying out the foregoing objects.

These and other objects are accomplished, in accordance with the illustrated embodiments of the present invention, by a valve which, similarly to prior valves of this type, has a chamber therein intermediate conduits connecting with the opposite ends of the body and a valve member movable within the chamber between conduit opening and closing positions. Also, and again as in previous valves of this type, an annular seat reciprocates within at least one of said conduits for engaging the valve member at its inner end, and a ring of sealing material surrounds the seat to form a seal with the seat and one conduit so that line pressure urges the inner end of the seat into sealing engagement with the valve member.

As distinguished from prior valves of this type, however, there is a shoulder on the body within the one conduit against which a surface on the seal ring surrounding the seat is engageable, and means are provided for yieldably urging this ring into sealing engagement with the seat and shoulder and the inner end of such seat into engagement with the valve member with forces which are, respectively, relatively large and small.

In a preferred construction the outer end of the seat also has a shoulder against which another surface on the ring is engageable, and the preloading means comprises a single spring acting between the shoulder on the conduit in the valve body and the end of the ring to urge both surfaces thereon against their respective shoulders. Thus, the full force of the preloading means is applied to the seal ring to establish a relatively high internal stress therein, while the inner end of the seat is urged into engagement with the valve member with a force which is only a portion of the force on the ring, dependent on the relative projections, on a plane transverse to the axis of the conduit, of the areas of the shoulders engaged by the seal ring. In another form of the invention, however, the seal ring surface engageable with the seat extends axially thereof so that the first spring does not impose any axial load on the seat, and another spring acting between a shoulder on the conduit in the body and the seat is disposed for yieldably urging the inner end of the seat against the valve member with a force independent of the first spring against the valve member. Of course, this latter spring may be of such construction that the axial force it applies to the seat is less than that applied to the seal ring.

In both forms of the invention, the shoulder on the body preferably flares outwardly so that the preloading spring acting thereon is more effective in causing the ring to seal uniformly against the seat. In the preferred form of the invention, the shoulder on the outer end of the seat flares inwardly so that the seal ring is free to move without having to flow around sharp corners as the seat is urged inwardly toward the valve member. In both forms of the invention, the seal ring is "Teflon" which, due to its low coefficient of friction with respect to metal, facilitates rotation of the seat about its axis.

In the drawings, wherein like reference characters are used throughout to designate like parts:

FIG. 1 is a longitudinal sectional view of a valve constructed in accordance with a preferred embodiment of the present invention, and with the valve member in an open position;

FIG. 2 is an enlarged sectional view of part of the unstream seat of such valve, but with the valve member in closed position;

FIG. 2A is a further enlarged sectional view of the seal ring and part of the seat and preloading means of the valve of FIGS. 1 and 2, but with all such parts advanced toward the valve member from the positions shown in broken lines;

FIG. 3 is a view similar to FIG. 2 of a modified form of the preferred embodiment of the present invention; and FIG. 4 is a view similar to FIGS. 2 and 3 of the other embodiment of the invention wherein the preloading is accomplished with two separate spring elements.

With reference now to the details of the above-described drawings, the valve 10 shown in FIG. 1 comprises a valve body 11 having a chamber 12 therein intermediate conduits 13 and 14 connecting with opposite ends of the body. A valve member 15 having an opening 16 therein is rotatable within the chamber between an open position in which the opening is aligned with the conduits 13 and 14 (see FIG. 1) and a closed position in which such opening is disposed transversely of the conduits. As shown in FIG. 1, the valve member is substantially ball-shaped and is mounted for rotation by means of stems 17 and 18 on its opposite ends received within bearings 19 and 20, respectively, on the body. As further shown in FIG. 1, the stem 17 extends outwardly from the valve body to provide an end 21 for connection with a suitable tool for rotating the valve member between opened and closed positions, and is surrounded by a seal ring 22 within the bearing 19 so as to prevent the escape of line fluid from the chamber 12.

A flange 23 is connected to the end of each conduit 13 and 14 of the valve body and has an inner extension 24 which fits closely within such conduit to retain an annular seat 25 received therein for engagement at its inner end with the valve member 15. As can be seen from FIG. 1, the opening 16 through the valve member 15, the bore through the seats 25, and the inner diameters of flange extensions 24 form a continuous flow passage through the valve in the open position of the valve member.

As also shown in FIG. 1, the valve member 15 carries a pair of dogs 26 on each side thereof for engagement with teeth 27 about the inner end of each seat 25. As disclosed generally in my aforementioned Patent No. 2,977,975, and as described more particularly in my Patent No. 3,157,190, these dogs are so arranged and guided as to rotate each seat a predetermined amount about its axis each time the valve member is moved from closed to opened position. In this way, the wear about the seat due to the impingement of fluid thereon during opening and closing of the valve member is distributed evenly about its circumference.

There is an annular recess on the inner end of the body of each seat which receives a wear ring 28 of deformable sealing material such as "Teflon" for sealing engagement with the valve member. More particularly, and as will be described hereinafter, each seat is sealably slidable axially and rotatably with respect to the conduit in which it is received so that line fluid acting across its outer end will urge the wear ring 28 into tighter engagement with the surface of the valve member. Thus, for example, when the conduit 14 is the inlet to the valve, and line fluid flows in the direction of the arrow of FIG. 1, the upstream pressure of the fluid will, upon closing of the valve, urge the seat and wear ring tightly into sealing engagement with the valve member. Obviously, the disposal of the identical seat on the opposite side of the valve member will permit reversal of flow, in which case the conduit 13 would provide the inlet to the valve.

As best shown in FIG. 2, the ring 28 protrudes from the inner end of the body of the seat so as to initially engage the valve member. More particularly, the inner end of the ring 28 is shaped to form a seal with the valve member over an annular area defined by its inner and outer diameter. However, whether this ring is formed of "Teflon" or some other deformable sealing material, the force with which it is initially preloaded against the valve member 15 will directly affect the torque required in moving the valve member between opened and closed positions. Also, and again as previously described, a portion of the opening 16 through the valve member will move past and uncover a portion of the wear ring 28 as the valve member rotates. During the time it is unsupported, the inner end of the wear ring will, if preloaded to too great an extent, expand into the opening so that as the opposite portion of the opening through the valve member moves past it, a part of the ring may be sheared off, or at least damaged to the point that it will not form an effective seal with respect to the valve member.

As shown in FIGS. 1, 2 and 2A, a ring 29 of sealing material, such as "Teflon," surrounds the seat 25 for sealing between it and the conduit 14. As also shown in FIGS. 1 and 2, and as will be described more fully to follow, the seal ring 29 as well as the wear ring 28 are preloaded into sealing engagement between the seat and body and between the seat and valve member, respectively, by means of a washer-type spring 30 acting between the extension 24 and a ring 31 of hard material bearing between the head of the spring and the outer side of the seal ring 29. As also shown in FIGS. 1 and 2, an O-ring 32 is carried about the seat 25 inwardly of the seal ring 29 to provide a barrier for preventing small solid particles from back-flowing between the seat and conduit into the cavity for the seal ring 29.

As shown in FIGS. 2 and 2A, there is a shoulder 33 on the valve body within the conduit 14 which flares outwardly with respect to the axis of the conduit and faces away from chamber 12 for engagement by a similarly tapered annular surface 34 on the outer surface of the seal ring 29. A shoulder 35 on the seat flares inwardly with respect to the conduit axis and also faces away from the chamber 12 for engagement by a similarly tapered surface 36 on the outer surface of seal ring 29. Thus, the shoulders 33 and 35 form an outwardly facing notch into which the converging surfaces 34 and 36 of the seal ring 29 fit snugly. To be more specific, the inner and outer annular surfaces 36 and 34, respectively, on the seal ring 29 intersect with one another at one end and with an end face of the ring at the other end, the intersection of the inner surface with the end face lying radially inwardly and the intersection of the outer surface with said end face lying radially outwardly of the intersections of said surfaces with one another.

The spring 30 is held between the flange extension 24 and the bearing ring 31 so as to impose sufficient force on the seal ring 29 to raise the internal stress thereof above the yield point of the "Teflon." This causes the surfaces 34 and 36 of the ring to form a uniform seal along the shoulders 33 and 35, respectively, and transmit a portion of the force of the spring to the seat and thus to the wear ring 28. As previously indicated, the portion of this force which is so transmitted depends upon the ratio of the areas of the surfaces 34 and 36 projected on a plane transverse to the axis of the conduit. Thus, as can be seen from FIGS. 1 and 2, the force preloading the ring 28 will be approximately one-fourth the force with which the seal ring 29 is preloaded. Obviously, the flare of the shoulders and corresponding taper of the surfaces of the ring 29 may be adjusted to provide different ratios.

When the seat 25 moves inwardly toward the valve member from the broken line position to the solid line position of FIG. 2A, the seal ring 29 will contract slightly circumferentially as it slides inwardly along shoulders 33 and 35. Thus, this tapering of the shoulders facilitates the maintenance of a tight seal between the ring and shoulders since there is no necessity of flowing around any sharp corners or bends. Also, this tapering of the shoulder 33 provides a better transmission of the force from the spring 30 in causing the ring 29 to seal tightly against the seat shoulder 35. Moreover, since the material of the seal ring 29 is prestressed beyond its yield point, the surface of the shoulder 33 need not be smoothly machined because the material can flow, instead of slide, to maintain sealing engagement. Further, there need be no rotation of surface 34 of the seal ring relative to the surface 33.

The modification shown in FIG. 3 is similar to that previously described in connection with FIGS. 1, 2 and 2A, except that the outer end of the seat 25 is reduced at 37 to a diameter substantially equal to the outer diameter of the wear ring 28 for reciprocation within an annular body 38 received through the end of the conduit 14. In this manner, fluid within the chamber 12 is free to act over equal and opposite areas on the seat ring to balance same insofar as line pressure in the valve is concerned.

In this case, the barrier ring 32 is carried about the reduced diameter 37 of the seat for cooperation with an opposite surface on the body 38 in protecting the seal ring 29. This adapter body 38 is assembled through the end of conduit 14 prior to mounting of flange extension 24 and carries a seal ring 39 of "Teflon" or the like which is held against a shoulder 39a in the conduit to form in effect part of the valve body. Thus, the body shoulder 33 for engagement by the surface 34 on the seal ring 29 is carried on this separate adapter, and the force of the spring 30 upon such seal ring is transmitted through this shoulder to yieldably urge the seal ring 39 against the shoulder 39a in the manner described. It will be noted, in this respect, that the shoulder 39a occupies the same position as the shoulder 33 in the modification of the invention described in FIGS. 1, 2 and 2A, so that the seat arrangement of the modification of FIG. 3 is interchangeable with the seat arrangement of the previously described modification.

In the other embodiment of the invention illustrated in FIG. 4, a seat 42 and a seal ring 41 of "Teflon" for sealing between the seat and the conduit 14 differ from the seat and seal rings 29 and 29a previously described in that they are engageable with one another along axially extending surfaces. Thus, there is no axial force transmitted from the spring 30 through the seal ring for preloading the inner end of the seat against the valve member. To the contrary, all of this axial force is transmitted to the seal ring 41 through an elongated bearing ring 42 between the seal ring and the head of spring 30.

The wear ring 28 on the inner end of the seat 42 may be similar to the corresponding ring of the other embodiment of the invention, although it is preloaded into sealing engagement with the valve member 15 by means of a separate spring 43 disposed between the spring 30 and the outer end of the seat 42. As can be seen from FIG. 4, the spring 43 comprises a toroidal coil which is somewhat flatened and surrounds a flanged retainer 44 welded at 45 to the conduit 14 to form part of the valve body. It is compressed to exert a force which is relatively small in comparison with the force exerted by the spring 30 on the outer end of the seat 42.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A valve, comprising a valve body having a conduit therethrough and a chamber therein intermediate the ends of the conduit, a valve member movable within the chamber between conduit opening and closing positions, an annular seat reciprocable within the conduit on one side of the chamber for engagement at its inner end with said valve member, an outwardly flaring shoulder on the body in said conduit, a ring of polytetrafluoroethylene having an inner surface surrounding and shaped to conform with a portion of the seat and an outer surface tapered to conform with said shoulder, and a washer type spring urging said ring axially inwardly to cause said outer surface to seal with said shoulder and said inner surface to sealingly engage with said portion of said seat.

2. A valve of the character defined in claim 1, wherein said portion of the seat which is surrounded by said ring comprises an inwardly flaring shoulder, and said spring also urges the inner end of the seat into sealing engagement with the valve member.

3. A valve of the character defined in claim 1, wherein said portion of the seat which is surrounded by the ring comprises a cylindrical surface coaxial with said ring, and said valve also includes another spring urging the inner end of the seat into sealing engagement with the valve member.

4. A valve of the character defined in claim 1, including means for rotating the seat about its axis so as to distribute wear thereabout.

5. A valve, comprising a valve body having a chamber therein and conduits connecting the chamber with opposite ends of the body, a valve member mounted on the body for movement within the chamber between positions opening and closing the conduits, an annular seat axially reciprocable within one of the conduits for engagement at its inner end with the valve member, an outwardly flaring shoulder on the body within said one conduit, an inwardly flaring shoulder on the seat oppostie the shoulder on the body, a ring of polytetrafluoroethylene surrounding the seat and having inner and outer surfaces tapered to conform with said shoulders, and a spring carried within the conduit for yieldably urging the tapered surfaces of said ring into sealing engagement with said shoulders and the inner end of the seat into sealing engagement with the valve member.

6. A valve, comprising a valve body having a chamber therein and conduits connecting the chamber with opposite ends of the body, a valve member mounted on the body for movement within the chamber between positions opening and closing the conduits, an annular seat axially reciprocable within one of the conduits for engagement at its inner end with the valve member, means for rotating the seat about its axis so as to distribute wear thereabout, an outwardly flaring shoulder on the body within said one conduit, an inwardly flaring shoulder on the seat opposite the shoulder on the body, a ring of polytetrafluoroethylene surrounding the seat and having inner and outer surfaces tapered to conform with said shoulders, and a spring carried within the conduit for yieldably urging the tapered surfaces of said ring into sealing engagement with said shoulders and the inner end of the seat into sealing engagement with the valve member.

7. A valve, comprising a valve body having a chamber therein and conduits connecting the chamber with opposite ends of the body, a valve member movable within the body between conduit opening and closing positions, an annular seat axially reciprocable within one of the conduits for engagement at its inner end with the valve member, an outwardly flaring shoulder on the body within one conduit, a ring of polytetrafluoroethylene surrounding the seat having an outer surface tapered to conform with said shoulder and an inner surface shaped to conform with the seat, a first spring carried within the one conduit for yieldably urging the ring into sealing engagement with said shoulder and seat, and a second spring carried within the one conduit for yieldably urging the inner end of the seat into sealing engagement with said valve member.

8. A valve, comprising a valve body having a chamber therein and conduits connecting the chamber with opposite ends of the body, a valve member movable within the body between conduit opening and closing positions, an annular seat axially reciprocable within one of the conduits for engagement at its inner end with the valve member, means for rotating the seat about its axis so as to distribute wear thereabout, an outwardly flaring shoulder on the body within one conduit, a ring of polytetrafluoroethylene surrounding the seat having an outer surface tapered to conform with said shoulder and an inner surface shaped to conform with the seat, a first spring carried within the one conduit for yieldably urging the ring into sealing engagement with said shoulder and seat, and a second spring carried within the one conduit for yieldably urging the inner end of the the seat into sealing engagement with said valve member.

9. A valve, comprising a valve body having a conduit therethrough and a chamber therein intermediate the ends of the conduit, a valve member movable within the chamber between conduit opening and closing positions, an annular seat reciprocable within the conduit on one side of the chamber for engagement at its inner end with said valve member, an outwardly flaring shoulder on the body in said conduit, a ring of polytetrafluoroethylene having an inner surface surrounding and shaped to conform with a portion of the seat and an outer surface tapered to conform with said shoulder, and a spring urging the ring axially inwardly to preload it and cause its outer surface to sealingly engage with said shoulder and its inner surface to sealingly engage with said portion of said seat, said ring being in a state of stress above its yield point.

10. A valve of the character defined in claim 9, including means on the end of the spring defining a flat, annular surface engaging over a coplanar surface on the end of the ring so as to substantially contain said ring.

11. A valve of the character defined in claim 9, wherein said portion of the seat which is surrounded by said ring comprises an inwardly flaring shoulder, and said spring also urges the inner end of the seat into sealing engagement with the valve member.

12. A valve, comprising a valve body having a conduit therethrough and a chamber therein intermediate the ends of the conduit, a valve member movable within the chamber between conduit opening and closing positions, an annular seat reciprocable within the conduit on one side of the chamber for engagement at its inner end with said valve member, an outwardly flaring shoulder on the body in said conduit, a ring of polytetrafluoroethylene having an inner surface surrounding and shaped to conform with a portion of the seat and an outer surface tapered to conform with said shoulder, a spring within the conduit yieldably urging the inner and outer surfaces of the ring into sealing engagement with said seat portion and body shoulder, respectively, with a force raising the internal stress of said ring above its yield point, and a bearing ring between the spring and sealing ring having an annular surface which is radially coextensive and coplanar with a major portion of the end of said sealing ring.

13. A valve of the character defined in claim 12, wherein said portion of the seat which is surrounded by said ring comprises an inwardly flaring shoulder, and said spring also urges the inner end of the seat into sealing engagement with the valve member.

References Cited by the Examiner

UNITED STATES PATENTS

| | | | |
|---|---|---|---|
| 2,520,288 | 8/1950 | Shand | 251—174 |
| 2,548,128 | 4/1951 | Snyder | 251—174 |
| 2,834,613 | 5/1958 | Snyder | 251—174 X |
| 2,977,975 | 4/1961 | Allen | 137—330 |
| 3,013,769 | 12/1961 | Volpin | 251—174 X |
| 3,097,823 | 7/1963 | Kaiser | 251—174 X |
| 3,157,190 | 11/1964 | Allen | 251—174 X |

ISADOR WEIL, *Primary Examiner.*